US012632327B2

(12) United States Patent
Parthasarathy et al.

(10) Patent No.: US 12,632,327 B2
(45) Date of Patent: May 19, 2026

(54) SYSTEMS AND METHODS FOR PERFORMING A ROOT CAUSE ANALYSIS UTILIZING PARAMETERS INCLUDING DEVICE CONTEXT FEATURES TO TROUBLESHOOT ENTERPRISE INFORMATION TECHNOLOGY PROBLEMS

(71) Applicant: Omnissa, LLC, Mountain View, CA (US)

(72) Inventors: Kannan Parthasarathy, Palo Alto, CA (US); Ruxi Zhang, San Jose, CA (US); Hayden Davis, Denver, CO (US)

(73) Assignee: Omnissa, LLC, Mountain View, CA (US)

( * ) Notice: Subject to any disclaimer, the term of this patent is extended or adjusted under 35 U.S.C. 154(b) by 130 days.

(21) Appl. No.: 18/348,447

(22) Filed: Jul. 7, 2023

(65) Prior Publication Data

US 2025/0013521 A1 Jan. 9, 2025

(51) Int. Cl.
*G06F 11/07* (2006.01)

(52) U.S. Cl.
CPC ........ *G06F 11/079* (2013.01); *G06F 11/0766* (2013.01)

(58) Field of Classification Search
CPC .......................... G06F 11/079; G06F 11/0766
See application file for complete search history.

(56) References Cited

U.S. PATENT DOCUMENTS

| | | | |
|---|---|---|---|
| 11,722,358 B1 * | 8/2023 | Gupta | H04L 41/0631 709/224 |
| 12,056,000 B1 * | 8/2024 | Kawata | G06F 11/0793 |
| 2017/0262781 A1 * | 9/2017 | Yang | G06Q 10/06393 |
| 2024/0202063 A1 * | 6/2024 | Kim | G06F 11/0709 |
| 2024/0248783 A1 * | 7/2024 | Kersch | H04L 41/0631 |
| 2024/0281316 A1 * | 8/2024 | Revanna | G06F 11/0793 |
| 2024/0370878 A1 * | 11/2024 | Lloyd | G06F 11/079 |
| 2024/0394136 A1 * | 11/2024 | Natschlaeger | G06F 11/0709 |

OTHER PUBLICATIONS

Cohen, Ira. What is Anomaly Detection? Anodot. https://web.archive.org/web/20220925073928/https://www.anodot.com/blog/what-is-anomaly-detection/. Accessed by Wayback machine on Sep. 25, 2022. (Year: 2022).*
Boomi. APIs and Microservices: A Catalyst for the Data-Driven Enterprise. https://boomi.com/blog/apis-and-microservices-data-driven-enterprise/ (Year: 2021).*
Lin, Fred ("Fast Dimensional Analysis for Root Cause Investigation in a Large-Scale Service Environment," 2020) (Year: 2020).*
Abraham, Lior ("Scuba: Diving into Data at Facebook," 2013) (Year: 2013).*

* cited by examiner

*Primary Examiner* — Ashish Thomas
*Assistant Examiner* — Kayo Lisa Rusin
(74) *Attorney, Agent, or Firm* — Kim & Stewart LLP

(57) ABSTRACT

Examples of troubleshooting enterprise information technology problems are described. In some examples, a root cause analysis service configures parameters for a root cause analysis. The parameters include device context features of client devices, which are specified to be analyzed. The root cause analysis service identifies a target issue affecting the client devices and performs the root cause analysis according to the parameters to generate root cause candidate patterns to provide through an interface.

18 Claims, 5 Drawing Sheets

START

303     Receive/Identify Target Issue(s)

306     Identify Lift Value and Support Value

309     Identify Target Device Context Features

312     Generate Set of Diagnoses

315     Generate UI that Visually Emphasizes
        A Subset of Diagnoses

SYSTEMS AND METHODS FOR PERFORMING A ROOT CAUSE ANALYSIS UTILIZING PARAMETERS INCLUDING DEVICE CONTEXT FEATURES TO TROUBLESHOOT ENTERPRISE INFORMATION TECHNOLOGY PROBLEMS

BACKGROUND

Information technology administrators in an enterprise can struggle to keep up with the large number of requests from employees to troubleshoot and fix issues. Information technology problems can be of many different types. Some are related to network or server outages, while others are due to issues on end-user devices; some are isolated and affect a very small number of users, while others are widespread and affect many users. Another example of an information technology problem is that of applying operating system and other patches to devices in an enterprise.

Despite extensive testing prior to the deployment of patches and the use of smart deployment strategies, new incompatibilities can be discovered after the deployment. The symptoms can be system crashes, inability to run some applications, high CPU utilization, and so on. Widespread problems can affect many users and can also result in significant loss of productivity. This can have a large impact including financial losses and time losses to the enterprise. As a result, there is a need for technologies that can make the process of troubleshooting and diagnosing information technology problems more efficient.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Figure 1:
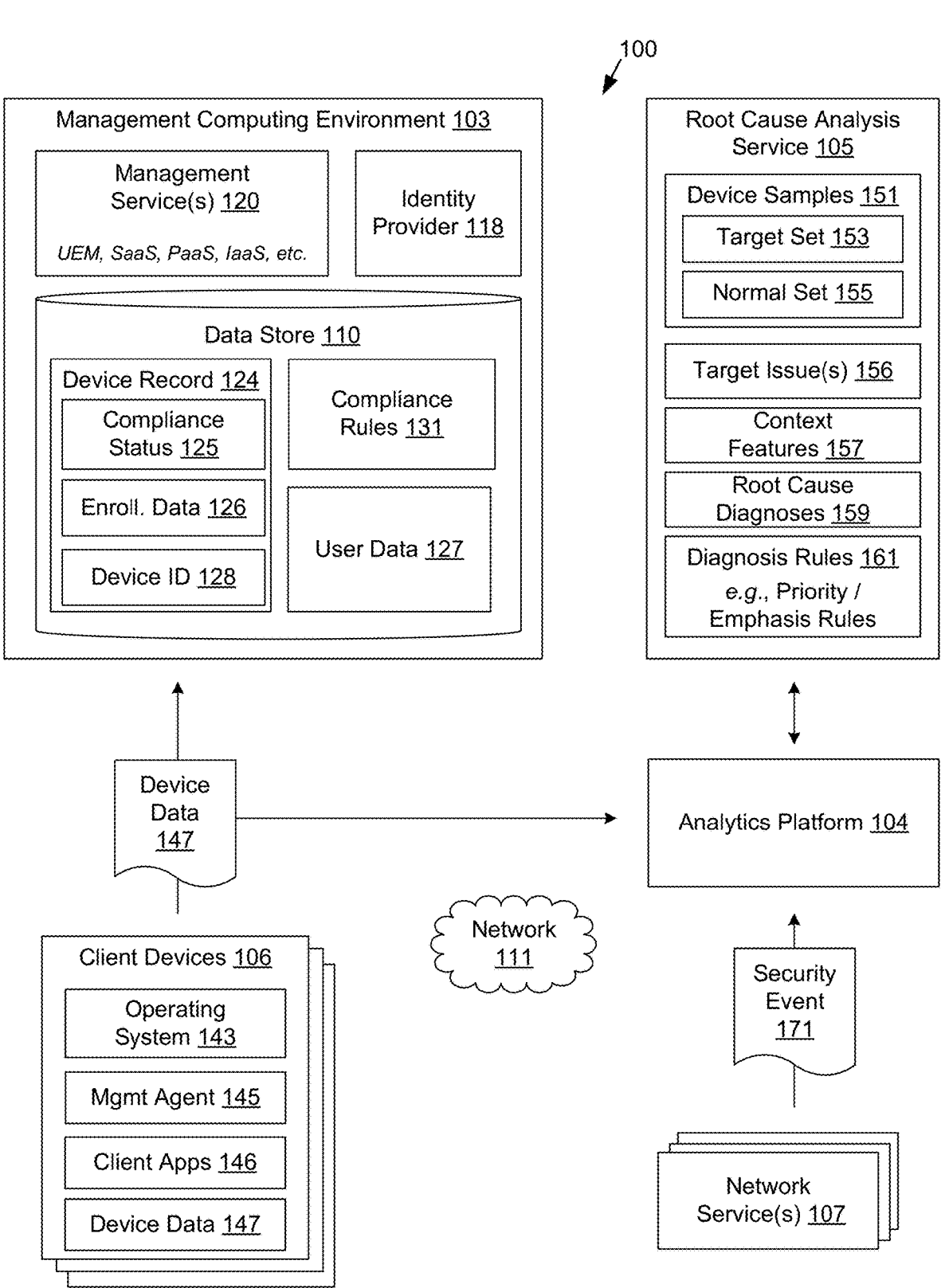
FIG. 1 illustrates an example networked environment that includes components that provide troubleshooting services for enterprise information technology problems, according to various examples described herein.

The present disclosure relates to providing troubleshooting services for enterprise information technology problems. As noted above, information technology administrators in an enterprise can struggle to keep up with the large number of requests from employees to troubleshoot and fix issues. Information technology problems can be of many different types. Some are related to network or server outages, while others are due to issues on end-user devices; some are isolated and affect a very small number of users, while others are widespread and affect many users. Another example of an information technology problem is that of applying operating system and other patches to devices in an enterprise.

Despite extensive testing prior to the deployment of patches and the use of smart deployment strategies, new incompatibilities can be discovered after the deployment. The symptoms can be system crashes, inability to run some applications, high CPU utilization, and so on. In this case the problem is widespread as it affects many users. Widespread problems can result in significant loss of productivity and can have a financial impact on the enterprise. As a result, there is a need for technologies that can make the process of troubleshooting and diagnosing information technology problems more efficient.

The present disclosure describes mechanisms that can enable troubleshooting enterprise information technology problems using telemetry data from end-user devices as well as network equipment and services. The telemetry data can be stored in a data lake and can be used to troubleshoot information technology problems when they occur, and to predict the occurrence of problems before they occur in the future using Artificial Intelligence (AI) and Machine Learning (ML) techniques. The telemetry data can help in detecting problems and identifying the root causes of the problems.

The present disclosure can include a system that automatically analyzes telemetry data collected from end user devices and finds root cause candidate patterns in the data that occur frequently when there are issues. Information technology administrators can then focus on the patterns provided to do further troubleshooting to confirm and remediate the provided potential root cause or causes of the problem. Using this system can reduce the time needed to troubleshoot and address widespread information technology problems in enterprises.

The root cause analysis disclosed herein can include identification of a target event, initial context feature set, and a context feature subset. A target event can relate to the symptom, problem, or issue being observed; examples include system crashes, boot times exceeding some threshold, etc. A target event or issue can be identified automatically by device data analysis as a precursor to running a root cause analysis, manually by an administrator, or both. The initial context set can include context features that are user-selected or historically more likely to be associated with the observed symptom or type or symptom. The root cause analysis can be limited to the initial context features. The context features subset can refer to a diagnosed subset of the initial context feature set that is analyzed to generate a list of device context features associated with affected devices at a higher rate relative to unaffected devices; for example, the context features subset can include device data such as device model, applications (including platform and access type) that were active on the device in the most recent 5 minutes (or other predetermined time period) before a system crash, and so on. The target event can be defined based on any observable (and potentially undesirable) symptom, and features included in the initial context feature set and context feature subset can be any values derived from device telemetry data. The system can identify and utilize context features and values thereof that are more likely to be associated with the observed symptom or type of symptom. This can help in narrowing the search space to find a root cause of the problem. For example, if a problem is occurring most of the time in a particular model of client device, it can be faster and more efficient to find the underlying root cause. This is in contrast with traditional root cause analysis, where the set of possible "faults" are known a priori, and the goal is to find one or more faults that caused an observed symptom.

In some examples, a system to troubleshoot information technology problems in enterprises can include a telemetry data collection system, including a data lake, to collect and store telemetry data in near real time from end user devices. The telemetry data can include events (e.g., device crashes) and performance metrics (e.g., CPU and Memory utilization). A database can keep the most up to date attributes for client devices. Examples of device attributes include the device make, OS version, and other similar attributes that are static or do not change very frequently. A user interface or application programming interface (API) can include the ability to specify parameters including (1) The symptom or issue to troubleshoot (e.g., system crash, slow boot time, application crash, and so on), (2) the time interval (i.e., start time and end time) to run the troubleshooting analysis, and (3) the set of issue-specific context features identified as relevant to the symptom by default and/or user-customized context features to utilize for analysis. A user interface and API can also provide an estimated time to run the trouble-shooting analysis with the selected parameters. A user inter-face and API can also request the start of a troubleshooting analysis with the parameters selected previously. The root cause service can retrieve device telemetry and attributes from the data lake and can use issue-specific or issue-agnostic logic and algorithms to identify a list of root cause candidate patterns in the context features that are more likely to be associated with the symptom. The root cause service can include a process that uses diagnosis rules to organize the list of patterns found previously into groups for efficient visualization and navigation. The root cause service can include an API and user interface to retrieve and display the results from the troubleshooting analysis.

The root cause troubleshooting architecture can provide a number of improvements over other technologies in the field including: increased efficiency provided by reduced memory, processing, and energy usage by selection of effective limitations for time intervals of limited target and normal device sample sets; increased efficiency of using a device that views the user interfaces produced, by providing concise and effectively emphasized diagnosis interface elements; increased efficiency of using a device that views the user interfaces produced, by reducing the time needed to troubleshoot and address widespread information technology problems in enterprises by automatically running certain root cause analyses, for example periodically or on a schedule; as well as additional computational benefits including improvement in the functioning of the overall architecture in instances where the analytics platforms, management services, and network services utilized are shared rather than duplicated by the root cause analysis service.

FIG. 1 illustrates an example networked environment 100 that includes components that troubleshoot enterprise information technology problems according to various examples described herein. The networked environment 100 includes a management computing environment 103, an analytics platform 104, a root cause analysis service 105, several client devices 106, and network services 107 in communication through a network 111.

The management computing environment 103 can be embodied as one or more computers, computing devices, or computing systems. In certain embodiments, the management computing environment 103 can include one or more computing devices arranged, for example, in one or more server or computer banks. The computing device or devices can be located at a single installation site or distributed among different geographical locations. The management computing environment 103 can include a plurality of computing devices that together embody a hosted computing resource, a grid computing resource, or another distributed computing arrangement. In some cases, the management computing environment 103 can be embodied as an elastic computing resource where an allotted capacity of processing, network, storage, or other computing-related resources varies over time. As further described below, the management computing environment 103 can also be embodied, in part, as certain functional or logical (e.g., computer-readable instruction) elements or modules as described herein.

The management computing environment 103 can operate as an environment for mobile device management and a unified endpoint management (UEM) platform that can manage the client devices 106, fixed drives, and other devices and endpoints. In that context, the management computing environment 103 includes a data store 110. The management computing environment 103 can also execute a management service 120 and an identity provider 118. The data store 110 includes areas in memory for the storage of device records 124 corresponding to client devices 106 that are registered and enrolled with the management service 120, as well as compliance rules 131 and user data 127.

The device records 124 can include a compliance status 125, enrollment data 126, device identifiers 128. The device records 124 can include or be associated with particular compliance rules 131 of a number of different compliance policies, user data 127 associated with user accounts that use the client device 106, among other types of data. The management services 120 can operate as a UEM platform that can manage client devices 106 that are enrolled as managed devices with the management service 120. The management services 120 can also include virtualization services that provide software as a service, infrastructure as a service, and platform as a service. This can include providing virtual desktop services, virtual applications and appliances, and other virtualization services for enrolled client devices 106.

The enrollment data 126 can indicate whether a particular client device 106 is enrolled with the management service 120. Enrollment can indicate that a management policy is enforced on, and/or the management agent 145 is installed to, the client device 106.

User data 127 represents information about users who have user accounts in the enterprise. These users can also have one or more client devices 106 that are enrolled as managed devices with the management service 120. User data 127 can include authentication data, and information about third party services with which the user is assigned an account.

The device identifier 128 can correspond to a unique device identifier assigned to a client device 106 upon enrollment. A device identifier 128 can alternatively refer to a manufacturer-assigned device identifier such as a serial number. A device identifier 128 can uniquely identify the client device 106 among other enrolled or monitored client devices 106.

Compliance rules 131 can include management rules, security rules, and other configuration data for execution by and/or enforcement on the client device 106. This can include management, security, and other configuration profiles that can include and enforce VPN certificates, Wi-Fi profiles, email profiles. In that context, during or after enrollment, the management service 120 can generate a set of management rules, security rules, and configuration data for the client device 106 and transfer those policies, rules, and data to the client device 106 for reference by the operating system 143 and certain applications executing on the client device 106.

The client devices 106 are representative of one or more client devices 106. Each client device 106 can be embodied as any computing device, processing circuit, or processor based device or system, including those in the form of a desktop computer, a laptop computer, a tablet computer, a personal digital assistant, a cellular telephone, a wearable computing device, or a set-top box, among other example computing devices and systems. Depending upon its primary purpose or function, for example, the client devices 106 can include various peripheral devices or components. The peripheral devices can include input or communication devices or modules, such as keyboards, keypads, touch pads, touch screens, microphones, cameras, wireless communications modules (e.g., infra-red, WI-FI, or BLUETOOTH®), buttons, switches, or sensors. The peripheral devices can also include a display, indicator lights, speakers, global positioning system (GPS) circuitry, accelerometers, gyroscopes, or other peripheral devices depending upon the primary purpose or function of the client devices 106.

An example client device 106 can be enrolled by the management service 120 for device management. A management agent 145 can be installed on a client device 106 to locally manage the device on behalf of the remotely executed management service 120. The management agent 145 can be installed with elevated privileges or be effectuated through operating system APIs to manage the client device 106 on behalf of the management service 120. The management agent 145 can have the authority to manage data on the client device 106, install, remove, or disable certain applications, or install configuration profiles, such as VPN certificates, Wi-Fi profiles, email profiles, etc. The management agent 145 can also have the authority to enable or disable certain hardware features of the client device 106 in certain instances. For example, the management agent 145 can also place the device into different hardware modes, such as airplane mode, silent mode, do-not-disturb mode, or other modes supported by the client device 106.

The client applications 146 can include applications that correspond to various platform types and delivery types. A particular client application 146 can have both a platform type and a delivery type. For example, client applications 146 can include application variants corresponding to certain platforms such as ANDROID applications, APPLE IOS applications, APPLE MACOS applications, WINDOWS applications. Client applications 146 can include application variants corresponding to delivery types including installed applications, RDSH applications, VDI applications, thin wrapped executable applications, application volumes applications, and others.

The device data 147 can include timestamped device telemetry such as device events, performance metrics, installed applications, active applications, operating system type and version, device model identifier, and so on. An active application can refer to an application that is executed or an application that is both executed and user-accessed, shown on screen, or otherwise active. Device telemetry can include operating system crashes, CPU or processor usage, memory (e.g., random access memory or other access memory) usage, device boot time, device shut down time, application hangs corresponding to temporary non-responsiveness, application crashes, increase/decrease of application usage, failed logins, failed application launch, application launch time, among others.

The management service 120, analytics platform 104, root cause analysis service 105, and/or network service 107 can monitor the device data 147 to identify a mean, median, or other "baseline" measure for various device parameters. Device events that can be automatically detected can include an overall deviation, across a set of client devices 106, indicating a spike, dip, or other accelerating or threshold-crossing measure of device telemetry data. An automatically detected device event can trigger the management service 120 or root cause analysis service 105 to automatically invoke APIs that configure and launch a root cause analysis by the root cause analysis service 105 to identify a root cause for the symptomatic device event.

The management agent 145 can also alter operation of the client device 106 in response to commands or policies provided by the management service 120 to the client device 106. For example, the management agent 145 can cause the client devices 106 to report certain types of device data 147 to the analytics platform 104 and the management service 120. The analytics platform 104 can reformat and aggregate the device data 147. The management service 120 can report and/or verify the device data 147 to the analytics platform 104. This can include any of the device data 147, which can be stored in the device record 124. The analytics platform 104 can expose an API that can be invoked to transmit device data 147 to the analytics platform 104. The root cause service can retrieve the device data 147 from a data lake of the analytics platform 104, for example, by invoking an API provided and exposed by the analytics platform 104.

The management agent 145 can poll the management service 120, or a command queue associated with the management service 120, to determine whether a management command intended for the client device 106 has been sent to the client device 106. In response to the command queue having a command for a client device 106, the management agent 145 can retrieve the command and execute the command on the client device 106. The commands can instruct the management agent 145 to collect and report device data 147, install a configuration profile, enforce a restriction or policy, or take other management actions on the client device 106. The commands can specify a network endpoint of an API or other interface of the analytics platform 104, another network service 107, or the management service 120, to which the management agent 145 is to transmit device data 147. The commands can also specify authentication data such as certificates, tokens that are used to authenticate with each specified interface.

The management service 120 can detect that the client device 106 is out of compliance with respect to a compliance rule 131 and can instruct the management agent 145 to restrict a hardware feature of the client device 106, delete data from the client device 106, or disable certain applications on the client device 106. The management agent 145 can also take other variations of management actions on the client device 106 as directed by the management service 120.

As part of the enrollment process, the management service 120 and/or management agent 145 can be registered as a device administrator of the client device 106, permitting the management service 120 and/or management agent 145 to manage certain operating aspects of the client device 106.

The management agent 145 can operate at a privileged level associated with a system account of the operating system 143. The management service 120 can remotely configure the client device 106 by interacting with the management agent 145. The management service 120 can also transfer various software components to the client device 106, and those software components can be installed and/or configured on the client device 106 at the direction of the management agent 145. Such software components can include, for example, applications, resources, libraries, drivers, device configurations, or other related components.

The management service 120 can also transfer various management policies, compliance rules 131, and configuration data for enforcement on the client device 106, and those policies, rules, and data can be stored on the client device 106 by the management agent 145. The management service 120 can then instruct the management agent 145 and the operating system of the client device 106 to enforce the management policies, compliance rules 131, and configuration data stored on the client device 106. The operating system 143 can include Windows®, Linux®, Apple®, Android®, iOS®, MacOS®, or another operating system. The operating system 143 can be utilized to enforce the compliance rules 131.

The compliance status 125 can identify which compliance rules 131 or policies a client device 106 or a user account linked to the client device 106 has violated. For example, the client device 106 may have been taken outside of a specified geofence defined for the client device 106.

The management service 120 can enroll several client devices 106 for mobile device management services. To begin enrollment, the management service 120 can identify and authenticate one of the client devices 106 and store data related to the client device 106 for later reference. In some cases, the management service 120 (or a management agent 145, an application, or a component executing on the client device 106) can also be registered as a device administrator (at least in part) of the client device 106, permitting the management service 120 to configure and manage certain operating aspects of the client device 106.

Once the client device 106 is enrolled for device management by the management service 120, the management service 120 can direct the installation of various software components and client applications 146 on the client device 106. The software components can be configured on the client device 106 at the direction of the management service 120. Such software components can include, for example, applications, resources, libraries, and other related components. Client application 146 installation can refer to standard installation of an application corresponding to a platform of the client device, or installation of components and authentication data to access a particular client application 146 corresponding to a specified virtualization or access type such as an installed application, RDSH application, VDI applications, thin wrapped executable applications, or application volumes applications.

The management service 120 can also provide a management console as an engine and console interface for device management of the client devices 106. An information technology administrator or user, for example, can view, administer, and update the management policies, compliance rules, and configuration data on the client devices 106 using the management console. The policies, rules, and configuration data can be collectively administered for several of the client devices 106 by organizing the client devices 106 into several different groups or categories of devices, according to organizational or other factors or considerations. The management console can also access information provided by the root cause analysis service 105, including root cause diagnoses 159 shown in a user interface that is generated for display on a client device 106 according to diagnosis rules 161.

The identity provider 118 can provide single sign-on or identity management capabilities for an enterprise. The identity provider 118 can allow users to authenticate his or her identity to obtain an authentication token that can be provided to a network service 107 or analytics platform 104. The identity provider 118 can utilize OAuth, security assertion mark-up language (SAML), or other single sign-on methodologies. The identity provider 118 and management service 120 can communicate so that the management service 120 can revoke or authorize access to various services for users in the enterprise based on status of a client device 106 assigned to the user. The identity provider 118 can also rely on user data 127 in the data store 110. In some examples, the identity provider 118 can rely upon a separate source of user data in a separate data store.

Each of the network services 107 can be embodied as one or more computers, computing devices, or computing systems. Like the management computing environment 103, the network service 107 can include one or more computing devices arranged, for example, in one or more server or computer banks. The computing device or devices can be located at a single installation site or distributed among different geographical locations. The network service 107 can include a plurality of computing devices that together embody a hosted computing resource, a grid computing resource, or another distributed computing arrangement. The network service 107 can also be embodied, in part, as certain functional or logical (e.g., computer-readable instruction) elements or modules as described herein.

The network services 107 can include first party and third party services provided by an enterprise to its users. A network service 107 can federate its authentication for users of the enterprise to the identity provider 118. A network service 107 can be a cloud-based storage service, recovery key escrow service, or another system for which the identity provider 118 can authenticate access by users of the enterprise. A network service 107 can be accessible over the Internet or another public WAN.

The analytics platform 104 can refer to a particular network service 107 that collects and in some instances analyzes device data 147 from the client devices 106. A network service 107 or the analytics platform 104 can identify device events that represent anomalous or errant behavior. The network services 107 of the analytics platform 104 can identify that a virus or another risk factor is generally present in one or more of the client devices 106. The network service 107 can identify the security risk and can generate and transmit a security event 171 notification to the management service 120.

The network services 107 can include endpoint security systems, such as security information and event management (SIEM) systems. The client devices 106 can communicate with the network services 107, and the network services 107 can provide device event information to the analytics platform 104. In other examples, the analytics platform 104 can identify device events that represent anomalous or errant behavior as discussed. In further examples, the network services 107 can generally identify security risks that are more generally propagating in the Internet or another wide area networking environment, whether or not the security risks are known to affect any of the client devices 106 enrolled with the management service 120. These wider events can be referred to as wide security risks herein, as opposed to device events that are identified using device data 147.

The root cause analysis service 105 can query the analytics platform 104 to retrieve, or otherwise receive, aggregated device data 147. The root cause analysis service 105 can generate and store device samples 151 using the device data 147 from the analytics platform 104. The device samples 151 can include timestamped device data 147 correlated to particular device identifiers 128. The target set 153 can refer to device samples 151 that include a particular target issue 156 within a particular time frame prior to a target issue time of the particular target issue 156, while the normal set 155 can refer to all other device samples 151 within the time frame that exclude the particular target issue 156.

A target issue 156 can be an automatically detected device event or anomaly, or a user-specified target issue 156 that is entered and defined through a console user interface. Context features 157 can refer to an initial context feature set that is to be used for a root cause analysis performed by the root cause analysis service 105. The root cause diagnosis 159 can refer to a diagnosed subset of the context features 157 that are identified as relevant to the target set 153 rather than, or at a greater rate than, the normal set 155. Each root cause diagnosis 159 for a root cause analysis can also specify feature combinations of two or more context feature types, such as device model and application identifier; device model, application identifier, and operating system; device model, application identifier, and application delivery type; application identifier, application delivery type, and another application identifier; and so on. The feature combinations can include a threshold number (e.g., at least one, at least two, etc.) of common context features 157 in order to be grouped into a single root cause diagnosis 159.

Diagnosis rules 161 can include a set of rules that the root cause analysis service 105 uses to generate the diagnosed subset of the context features 157. Diagnosis rules 161 can also include a set of rules that the root cause analysis service 105 uses to generate a user interface that organizes, limits, and emphasizes the diagnosed subset of the context features 157 to provide a more efficient overview of the problem, along with the ability to drill down to see additional details that are included in the root cause diagnoses 159, the wider context features 157 considered in the analysis, and even client device data 147 that was not utilized for the root cause analysis. The diagnosis rules 161 can also include information about how to order and present a set of multiple different root cause diagnoses 159 identified for a single root cause analysis corresponding to one or more target issues 156. The diagnosis rules 161 can also limit the set of root cause diagnoses 159 identified for a single root cause analysis to a predetermined maximum number of root cause diagnoses 159.

Limits can be provided to make the root cause diagnosis 159 more concise according to general priority rules and issue-specific priority rules. General priority rules can prioritize certain device data 147 types (and combinations of data types) above other device data 147 for any target issue 156, while issue-specific priority rules can prioritize certain device data 147 types above other device data 147 for a particular type of target issue 156.

The root cause analysis service 105 can use emphasis rules to emphasize a root cause diagnosis 159 according to general emphasis rules and issue-specific emphasis rules. General emphasis rules can emphasize certain device data 147 and for any target issue 156, while issue-specific priority rules can prioritize and emphasize certain device data 147 types above other device data 147 for a particular type of target issue 156.

The network 111 can include the Internet, intranets, extranets, wide area networks (WANs), local area networks (LANs), wired networks, wireless networks, cable networks, satellite networks, other suitable networks, or any combinations thereof. As one example, the management computing environment 103 and the client devices 106 can be respectively coupled to one or more public or private LANs or WANs and, in turn, to the Internet for communication of data among each other. Although not shown in FIG. 1, the network 111 can also include communicative connections to any number and type of network hosts or devices, such as website servers, file servers, cloud computing resources, databases, data stores, or any other network or computing architectures.

In the networked environment 100, the management computing environment 103, the network service 107, and the client devices 106 can communicate data among each other over the network 111 using one or more network transfer protocols or interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), other protocols and interconnect frameworks, and combinations thereof.

Figure 2:
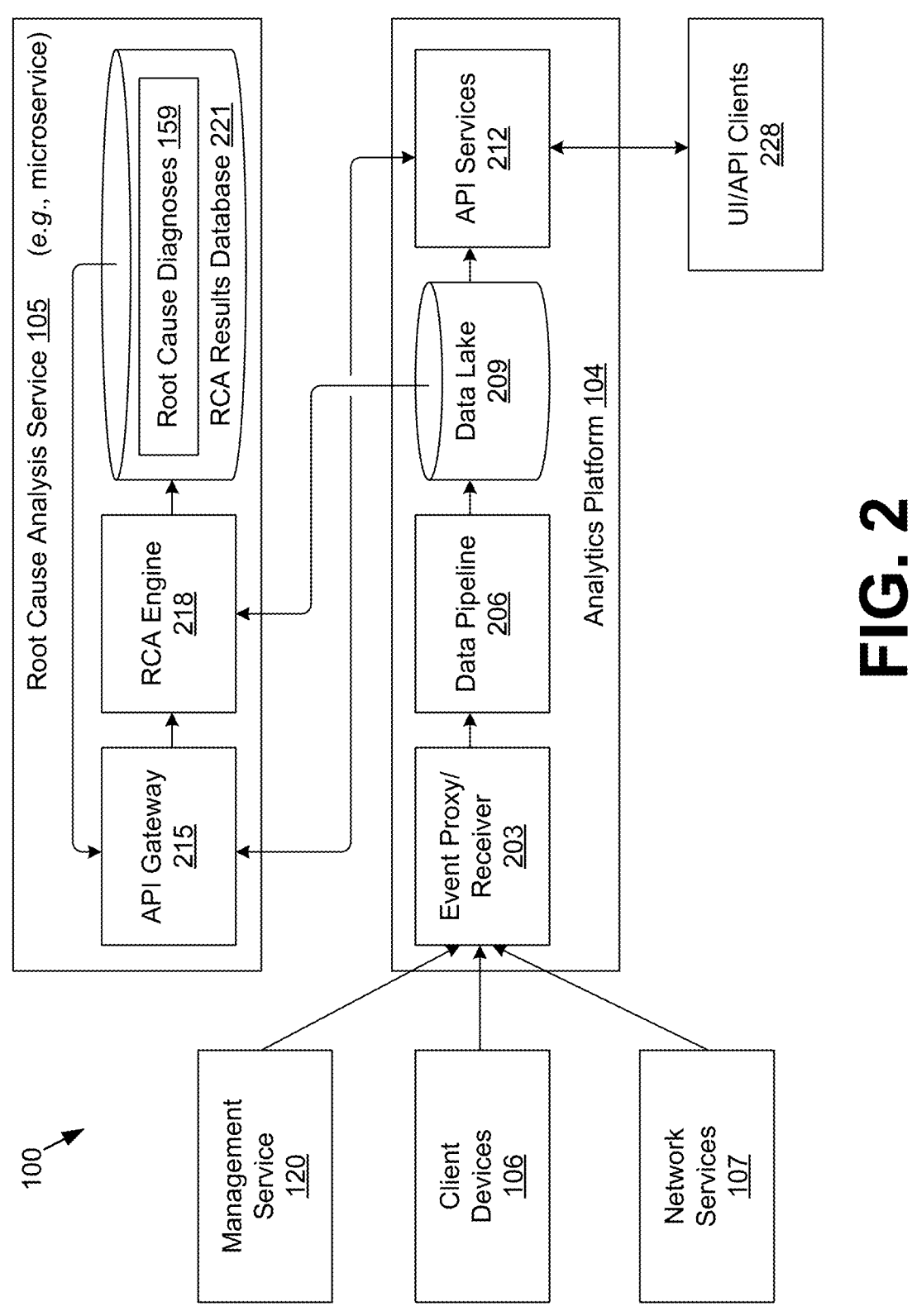
FIG. 2 illustrates an example of the operation of the networked environment to provide troubleshooting services for enterprise information technology problems, according to various examples described herein.

FIG. 2 shows an example of how the components of the networked environment 100 can interact to provide troubleshooting services for enterprise information technology problems affecting the client devices 106. Generally, this example provides an example of how the analytics platform 104 receives information from the management service 120, client device 106, and network services 107, and stores it for use by the root cause analysis service 105 to generate root cause diagnoses 159.

The analytics platform 104 receives data from a variety of data sources including management services 120, endpoint client devices 106, and other data sources such as endpoint security systems, security information and event management systems, identity and access management systems, and other network services 107. The analytics platform 104 receives the information from all data sources by an event proxy/receiver 203. Event proxy/receiver 203 provides the events and other data to a data pipeline 206 for processing and reformatting. The data pipeline 206 can reformat the data by identifying the format or the source of the received information, and applying a reformatting process associated with the identified format or source. The data pipeline 206 can store the reformatted data in the data lake 209.

The analytics platform 104 receives and stores information that includes, but is not limited to, enrollment of new client devices 106 with the management service 120, installation of new applications on the client device 106, changes in the settings of a client device 106, software updates to the operating system 143 and client applications 146, booting and shutdown of client devices 106, client application 146 start of execution, stop of execution, and foreground/background events (e.g., indicative of active or inactive applications compared to executed/unexecuted), operating system crashes, application crashes, and resource (CPU, memory, disk) utilization on client devices 106. This information can be provided by any of the client devices 106, management services 120 (e.g., including one or more of a UEM service and a virtualization service), or the network services 107.

When a client device 106 is enrolled with the management service 120, attributes of the client device 106 such as the device model, manufacturer, hardware properties such as memory and disk sizes, as well as a predetermined set of configuration information of the client device 106, can be captured by the management service 120 and sent to the analytics platform 104. Device data 147 such as resource utilization and device events can be collected continuously on the various client devices 106 and sent to the analytics platform 104.

The information processed through the data pipeline 206 can be stored in the data lake 209. In some cases, the data pipeline 206 or additional processing modules of the analytics platform 104 can perform aggregations and other reformatting actions on received and historical data and store the results in the data lake 209. The analytics platform 104 can provide API services 212 that can expose the data in the data lake 209 to the root cause analysis service 105 as well as user interface/API (UI/API) clients 228. The UI/API clients 228 can include administrative and other users that use a client device 106 to view a user interface, as well as automated business intelligence systems, automation platforms, and other network services 107. The various UI/API clients 228 can submit a root cause analysis request to the analytics platform 104 or the root cause analysis service 105. The UI/API clients 228 can include a standalone application running on a desktop computer, laptop computer, or a mobile device. The UI/API clients 228 can also be web application that can be accessed from any client device 106 that has a supported web browser.

The root cause analysis service 105 can be implemented as a standalone system that interfaces with other components of the networked environment 100. It can also be implemented as a micro-service and integrated into the analytics platform 104 of the management service 120. In further examples, one or more components of the root cause analysis service 105 can be implemented in a standalone fashion and the other parts can be integrated into an analytics platform 104 or management service 120. Components of the root cause analysis service 105 can be implemented as a cloud service on public clouds, or can run on-premises within an enterprise data center.

The root cause analysis service 105 exposes one or more root cause configuration API using an API gateway 215. The API gateway 215 can include a representational state transfer (REST) endpoint. The root cause configuration API or APIs can be used to set parameters for a root cause analysis, get an estimate of the runtime for a root cause analysis based on the selected parameters, start a root cause analysis process, and retrieve the results of a root cause analysis.

When the API gateway 215 receives a request to start a root cause analysis process, it can submit that request to the root cause analysis execution engine 218. The root cause analysis execution engine 218 extracts the relevant and/or specified data from the data lake 209 and finds root cause candidate patterns in the specified context features 157 that are more likely to be associated with a target issue 156 indicated through the root cause configuration API. The patterns that are detected by the root cause analysis execution engine 218 are stored in root cause analysis results database 221 as root cause diagnoses 159. The patterns defining the root cause diagnoses 159 can include a list of combinations of context features 157 considered by the root cause analysis execution engine 218. The analytics platform

104 provides the list of patterns of the root cause diagnoses 159 for viewing in a console user interface and retrieval programmatically using one or more of the API services 212. Programmatically retrieved information can be displayed in a custom user interface or used in an automation framework of a network service 107 or management service 120. While the analytics platform 104 can provide the console user interface and the API services 212, the management service 120 can alternatively provide this functionality. In some examples, the analytics platform 104 can be considered a portion of the management service or services 120.

The operation of the root cause analysis execution engine 218 can include a fast dimensional analysis, or another multifaceted analysis technique that is specially adapted and extended to generate root cause diagnoses 159 for problems with client devices 106 managed by management services 120 and utilized in enterprise environments. The processing steps in the root cause analysis execution engine 218 can include configuration of the target issue 156, context features 157, and diagnosis rules 161 using the API gateway 215, retrieving device data 147 from the data lake 209, creating a target set 153 and a normal set 155 for the target issue 156 and the selected context features 157, performing frequent pattern mining to generate overlapping context features 157 in target samples of the target set 153, computing a lift parameter, as well as filtering, grouping, and storing the results as root cause diagnoses 159 according to the lift and support requirements of the diagnosis rules 161, and generating a user interface that effectively surfaces the most relevant information.

Depending on how data is laid out in the data lake 209, retrieving the information can include retrieving data from multiple databases and joining the disparate data sources to create a single table or data structure. Each row or element in the table or data structure can be referred to as a data sample 151. The data sample 151 can include a device identifier 128 of an enrolled client device 106, a timestamp, and a flag that indicates that the data sample 151 is a target sample for the target set 153 or a normal sample for the normal set 155. A target sample can include a data sample 151 for which the root cause analysis service 105 identifies a problem specified and logically as a target issue 156. A normal sample can include a data sample 151 for which the problem was not observed or identified.

For example, if the problem being investigated is an operating system crash, then the target samples are those where operating system crashes were observed over a specified time window, and normal samples are those where system crashes were not observed for the time window (or for a larger time window, or for all time, depending on the diagnosis rules 161). Each row or element in the table or data structure includes additional columns or properties corresponding to the context features 157. The set of context features 157 can be user selected or automatically selected corresponding to the target issue 156. In the example of user-selected context features 157, a user interface can present with a set of available context features 157, along with user interface elements that are user-activated to select or unselect context features 157. The set of available features provided through the user interface can be identified and provided based on the types of device data 147 that is collected by the analytics platform 104. The context features 157 can include device data 147 such as make and model, operating system version, BIOS version, physical memory size, CPU type, and any of the device data 147 discussed above.

The set of context features 157 can also include a list of operating system patches that have been applied on the client device 106 in a threshold time prior to the sample timestamp. The set of context features 157 can also include a set of applications that were active and/or executed on the client device 106 in a time window prior to the sample timestamp. The set of context features 157 can also include a version number of each client application 146 downloaded, installed, active, and/or executed, in the recent past according to a threshold time prior to the sample timestamp. This set of context features 157 is nonlimiting and can further include any of the device data 147 and events referred to herein, collected according to a threshold time prior to the sample timestamp. Any subset of the features shown above can be used as well. The various context features 157 discussed above can also be collected as device data 147. Some of context features 157 can change slowly over time, such as the operating system version, and some are fixed over the lifetime of the client device 106, such as the device make or manufacturer and model.

An example process of creating a sample dataset for troubleshooting system crashes is further described here. A user can navigate a user interface to select a time window and context features 157 for root cause analysis of a selected target issue 156. Alternatively, the management service 120, analytics platform 104, or root cause analysis service 105 can select the time window and context features 157 for a programmatically identified target issue 156. The set describing instances of the target issue 156, such as operating system crashes, during the time window can be retrieved from the data lake 209. For each operating system crash instance, other client devices 106 that were active around the same time when the crash occurred can be randomly sampled. In other words, the root cause analysis service 105 can take a random or pseudorandom sampling of the normal set 155 (and/or the target set 153) that can be utilized for the analysis. The sampling can occur prior to, during, or after retrieval of device data 147 from the data lake 209. The term random can be used herein to refer to random or programmatically pseudorandom. The root cause analysis service 105 can also take a proportional sampling of the normal set 155, such that a proportion of target set 153 and normal set 155 for all device samples 151 in the time window matches that of the subset of proportion of the target set 153 and subset of the normal set 155 for the random subset of device samples 151.

Sampling can be useful for controlling the size of the analysis dataset so that the overall runtime of analysis is within reasonable limits. An increased sample size can increase estimated runtime, while a decreased sample size can decrease estimated runtime. In other words, sample size can be directly proportional to runtime. Sample size can be set using arbitrary or friendly names, icons, or indicators; length-specifying, time-specifying, or size-specifying terms; a slider, segment selector, or other types of user interface elements.

For each sample instance, the root cause analysis service 105 can extract the relevant context features 157 from the data lake 209. As described above, the target set 153 corresponds to device samples 151 containing system crashes in the time window, and the normal set 155 corresponds to the other device samples 151 that omit or lack the system crashes. While the sample creation process has been described for system crashes, the same approach can be used for troubleshooting other target issues 156 including problems with device boot time, device shut down time, application hangs corresponding to temporary non-responsiveness, application crashes, increase/decrease of application usage, failed logins, failed application launch, application launch time, and so on. Problems can include slower or faster times, greater or fewer instances of the issue, and so on. In other words, the analysis dataset can contain device samples 151 where the target issue 156 or event occurs as well as those where the target issue 156 does not occur. The root cause analysis service 105 can logically split the analysis dataset into two subsets, the target set 153 and the normal set 155.

The root cause analysis service 105 can utilize an algorithm for frequent pattern mining. The root cause analysis service 105 can analyze the target set 153 using the frequent pattern mining algorithm to identify frequent root cause candidate patterns in the target set 153. One example of an efficient algorithm for frequent pattern mining can include FPGrowth algorithm. Other algorithms for frequent mining can be used. For example, when there is a constraint on the pattern length, a simple recursive algorithm can be used to find frequent patterns.

One concept in frequent pattern mining is support. The support of a pattern can refer to the percentage of target set 153 samples where that pattern occurs. The support can be included as a diagnosis rule 161 or configuration rule for the root cause analysis. By setting a minimum support threshold, the frequent pattern mining algorithm can prune or remove non-viable root cause candidate patterns while they are being built. The frequent pattern mining algorithm outputs a list of frequent patterns, each of which has a support value in the target set that exceeds the minimum support threshold selected. The minimum support threshold value can be selected as a universal default value, an issue-specific default value, or a customized parameter user-selected through a user interface. Each frequent pattern can refer to a subset of the context features 157 selected for analysis. Patterns can be of variable length.

The root cause analysis service 105 can then turn to the normal set 155, and calculate a support value for each frequent pattern that is pattern mined from the target set 153. The support for a pattern in the normal set 155 can be the percentage of samples in the normal set 155 that contain the pattern.

Another concept in frequent pattern mining can include lift. A lift value can indicate how much more likely it is to find a pattern in the target set 153 compared to the normal set 155. For example, if a particular pattern is found in 10% of the target set and 1% of the time in the normal set, then the lift value for that pattern would be 10. This lift value indicates that it is 10 times more likely to find the pattern in the target set 153 relative to the normal set 155.

The root cause analysis service 105 can calculate a lift value for each pattern that is pattern mined from the target set 153. The lift value can be calculated according to equation (1):

$$\text{lift} = \frac{\text{support of pattern in target set}}{\text{support of pattern in normal set}} \quad (1)$$

A minimum lift threshold value can be selected as a universal default value, an issue-specific default value, or a customized parameter user-selected through a user interface. The root cause analysis service 105 can use the threshold lift value to produce a subset of frequent patterns in the target set 153, based on those patterns that have support according to the threshold support value.

The root cause analysis service 105 can, for each frequent pattern, identify a corresponding support value from the target set 153 and a lift value relative to the normal set 155. In some instances, the number of frequent patterns above the minimum support threshold can be quite large. Some contextually-overlapping or otherwise similar patterns can have similar support and lift values. For example, root cause analysis service 105 can identify the patterns {"A", "B", "C", "D"} and {"B", "C", "D", "E"} as similar if they have a threshold number overlapping or "common" context features 157. In the context of the root cause analysis, presenting a large number of patterns for further investigation can be inefficient and counterproductive. The root cause analysis service 105 can use a grouping algorithm or other process to group patterns that are identified as similar according to the grouping algorithm. Alternatively, the root cause analysis service 105 can group patterns that include a threshold number of overlapping context features 157 that are within a threshold distance in value in one or more of support and lift. In some examples, the root cause analysis service 105 can select one pattern from a group of similar patterns as representative, selected while the rest are discarded. However, in other examples, the diagnosis rules 161 can indicate to initially show the representative pattern in a user interface, while the other patterns are initially hidden. The user interface can include a user interface element that shows or reveals the other patterns when selected.

The root cause analysis service 105 can filter, prioritize, show, hide, and otherwise organize the root cause candidate patterns for access and viewing through user and programmatic interfaces using a number of diagnosis rules 161. One diagnosis rule 161 can be based on the lift value. The diagnosis rules 161 can direct the root cause analysis service 105 to identify a threshold for minimum lift and remove or hide patterns with lift values below the threshold. Higher values of lift can indicate high confidence that the pattern can help determine the root cause of the problem, but lower lift values can increase a number of patterns that are identified, leading to more data to analyze and present. The root cause analysis service 105 can identify and show a predicted confidence level and calculation time, where the predicted confidence level and calculation time are directly proportional to higher values of lift.

The root cause analysis service 105 can also organize based on lift similarity. This type of diagnosis rule 161 can help to reduce the number of patterns that have a superset-subset relationship as well as similar lift values. For example, root cause analysis service 105 can analyze the patterns, and a pattern T can be dropped, deprioritized, or hidden if there is another pattern U that is a proper subset of T(U ⊂ T) and lift(U)*$H_{lift}$≥lift(T). In some examples, $H_{lift}$≥1 can be a constant parameter of the algorithm. Other values of $H_{lift}$ can also be used in alternative examples. Simply stated, longer patterns can be dropped if there is a shorter pattern with similar or higher lift.

The root cause analysis service 105 can also organize results based on support similarity. The root cause analysis service 105 can use this type of diagnosis rule 161 to reduce the number of patterns that have a subset-superset relationship, similar support values, and significantly different lift values. A pattern T can be dropped if there is another pattern S that is a superset of T(S ⊃ T), supp(S)*$H_{supp}$≥supp(T), and lift(S)>lift(T)*$H_{lift}$, where $H_{supp}$≥1 and $H_{lift}$≥1 (or other value). In other words, smaller patterns can be dropped if there is a larger pattern with similar support values but significantly greater lift values according to relevant thresholds. Other filtering rules that remove, deprioritize, and hide similar patterns can also be used. For example, patterns can be clustered into groups and one representative pattern for each group can be used.

The root cause analysis service 105 can also collate the resulting prioritized or filtered patterns into a smaller set of groups, where each group is represented by a common anchor item or pattern. The root cause analysis service 105 can train a linear regression or another machine learning model that takes the frequent patterns mined as the input and predicts its lift value. The root cause analysis service 105 can use one-hot encoding or another process to convert the frequent patterns into a feature vector. Weights of the linear regression model can indicate how important a context feature 157 or other parameter is in predicting the lift value. In this way, individual context features 157, diagnosis rules 161, and patterns can be ordered by their importance, and used as anchor items for easier navigation. The machine learning model can be trained and used generally or specific to a particular target issue 156.

The root cause analysis service 105 can remove, hide, or deprioritize context features 157 with weight values below a threshold in order to filter out results that are associated with low confidence. A threshold number or percentage of the overall set of context features 157 can be identified generally or as target-issue-specific default context features 157. A linear regression model is one example of a regression model. Other regression models such as decision trees, ensemble models, and deep learning models can be used as well. In the various examples, the importance of each context feature 157 can be determined to rank order the anchor times for organization. Each anchor item can represent a group. For each anchor item, all frequent patterns in the results that contain the anchor item can be added to the group. The grouped results can be stored as root cause diagnoses 159 in the root cause analysis results database 221.

These root cause diagnoses 159 can then be exposed for access in user interfaces and programmatic interfaces such as APIs along with and according to the organization parameters discussed. In the case of a user interface, this can include removing, hiding, deprioritizing in a list or other visual structure according to rank value scores that correspond to the parameters discussed. In the case of a programmatic interface, this can include removing certain data from provided results, or providing rank scores along with the patterns corresponding to the root cause diagnoses 159. In either interfacing example, the resulting root cause diagnoses 159 provided can increase data and/or time efficiency for users, accessing devices, and services alike.

Figure 3:
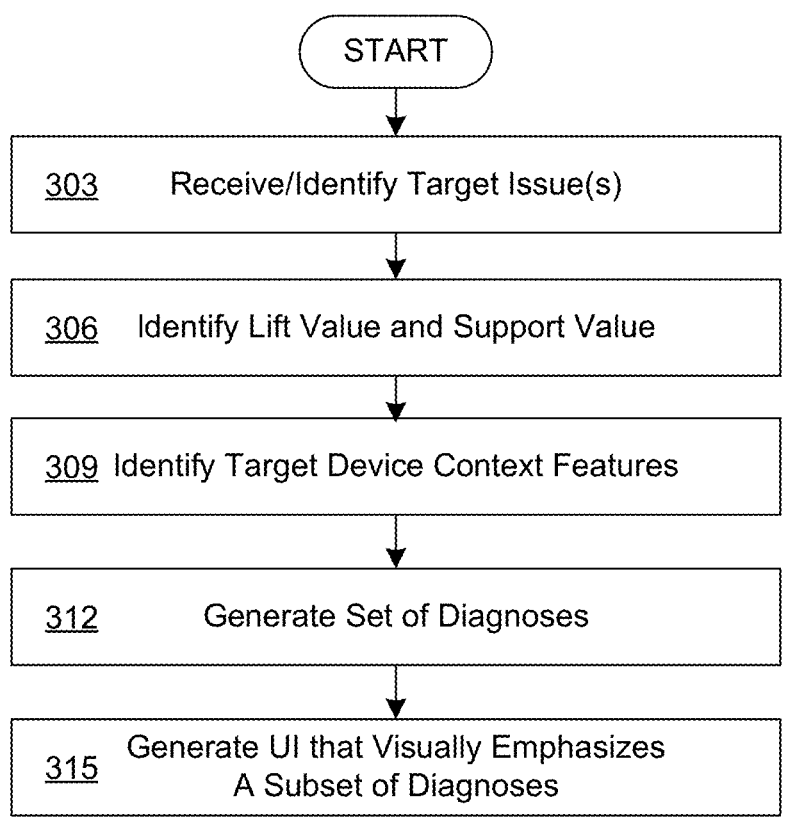
FIG. 3 illustrates a flowchart performed by components of the networked environment to provide troubleshooting services for enterprise information technology problems, according to various examples described herein.

FIG. 3 shows a flowchart performed by components of the networked environment 100. The flowchart illustrates how the root cause analysis service 105 can interact with components of the networked environment 100 to troubleshoot enterprise level information technology problems for managed client devices 106.

In step 303, the root cause analysis service 105 can receive or identify a target issue 156 for a root cause analysis. The target issue 156 can be an automatically detected device event or anomaly, or a user-specified target issue 156 that is entered and defined through a console user interface. For example, the analytics platform 104 can detect the device event or anomaly, and can transmit a root cause analysis request to the root cause analysis service 105 that specifies the device event as a target issue parameter. Alternatively, a user can access a console user interface of the management service 120, the analytics platform 104, or the root cause analysis service 105 to enter a target issue 156.

The user can select a user interface element that causes the service that provides the console user interface to transmit a root cause analysis request to the root cause analysis service 105.

The target issue 156 can be of a particular type such as an operating system crash, operating system slow shutdown, operating system hang, and so on. In other words, the target issue 156 can specify a target subject such as the operating system, device, or application, as well as a target issue 156 such as a crash, slow shutdown, hang, and so on. In this example, a parameter can specify a particular operating system or operating system version that further defines the target issue 156. Otherwise, another parameter, or lack of operating system parameter, can indicate that all operating systems are to be analyzed. If a target issue 156 is an issue type specific to applications, the parameter can specify a particular application, which can include parameters for an application identifier or name, version, platform, and delivery type. Another parameter, or lack of one of the applications parameters, can indicate that all identifiers, versions, and platforms should be considered. Target issues 156 can be operating system specific, device specific, and application specific in various examples.

In step 306, the root cause analysis service 105 can identify a lift value thresholds and support value thresholds for the root cause analysis. In some examples, the root cause analysis service 105 can be preconfigured with a default lift value threshold and a support value threshold for any root cause analysis, or a default lift value and support value specific to each target issue 156. The root cause analysis service 105 can expose a set of APIs through which the various analysis configurations and other diagnosis rules 161 can be set or configured. The management service 120 or analytics platform 104 can provide a user interface through which a user can define a threshold minimum lift value, a threshold minimum support value, and other configurations and other diagnosis rules 161. These configurations and other diagnosis rules 161 can apply to all analyses, a particular single analysis, or a particular type of target issue 156.

In step 309, the root cause analysis service 105 can identify target device context features 157 for the root cause analysis. In some examples, the root cause analysis service 105 can be preconfigured with a default set of device context features 157 for any root cause analysis, or a default set of device context features 157 for each target issue 156. The root cause analysis service 105 can expose a set of APIs through which the various device context features 157 and other diagnosis rules 161 can be set or configured. The management service 120 or analytics platform 104 can provide a user interface through which a user can define device context features 157 for a particular root cause analysis, for a particular type of target issue 156, or for all target issues 156.

The root cause analysis service 105 can also identify target device context features 157 by training a machine learning model over a number of root cause analysis types for a number of target issues 156 as discussed above, and then setting the default set of context features 157 for a particular type of target issue 156, or for all target issues 156. The root cause analysis service 105 can configure the default set of context features 157 based on the context features 157 that provide a highest correlation to lift and/or support generally or for a particular target issue 156 or type of target issue 156.

In step 312, the root cause analysis service 105 can generate a set of root cause diagnoses 159 for the target issue

156. Once fully configured, the root cause analysis service 105 can initiate a root cause analysis. The root cause analysis can include retrieving relevant data, processing and formatting data samples 151, creating a target set 153 and a normal set 155, identifying patterns of device context features 157 using a frequent pattern mining algorithm, calculating support for each pattern in the target set 153 to narrow the patterns to those that meet a threshold support, calculating support for those patterns in the normal set 155 in order to identify lift, reducing the set of patterns to those that meet a threshold lift, and organizing and grouping the remaining patterns. The resulting output can be considered a set of root cause diagnoses 159 or a root cause diagnosis 159 that includes multiple patterns of device context features 157, among various implementations.

In step 315, the root cause analysis service 105 can generate a user interface that visually emphasizes at least a subset of the root cause diagnoses 159. The root cause analysis service 105 can prioritize and emphasize the root cause diagnoses 159 according to the diagnosis rules 161. Additionally or alternatively, the root cause analysis service 105 can expose a programmatic interface such as an API through which the root cause diagnoses 159 can be retrieved by the network services 107, the client devices 106, and the management services 120.

Figure 4:
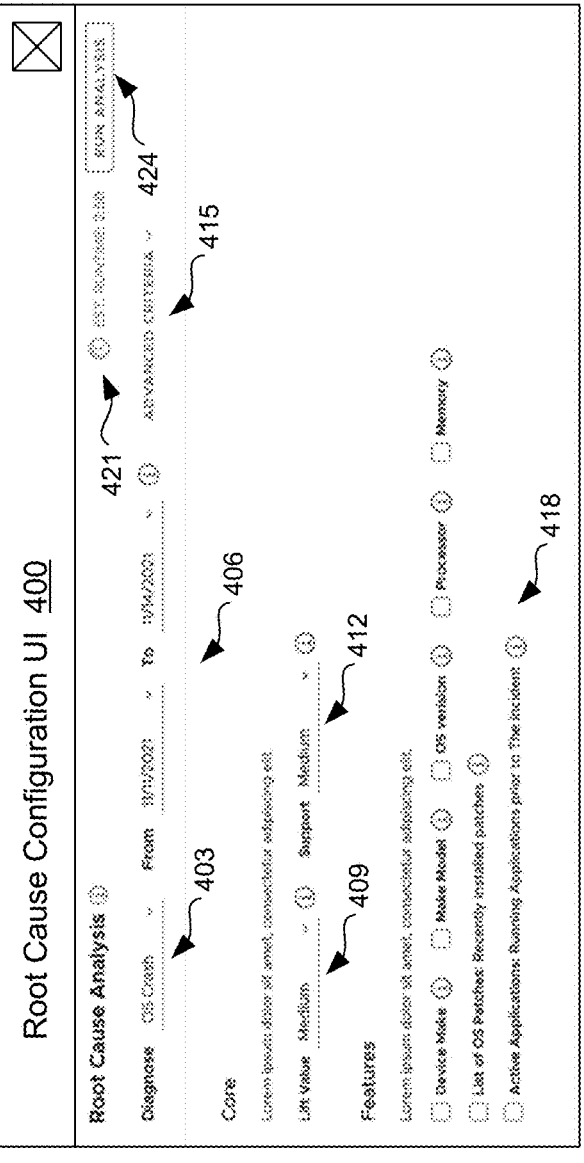
FIG. 4 illustrates an example user interface to provide troubleshooting services for enterprise information technology problems, according to various examples described herein.

FIG. 4 shows an example root cause configuration user interface 400. The root cause configuration user interface 400 can be provided as part of a management console of the management service 120, the analytics platform 104, the root cause analysis service 105, or a network service 107. The root cause configuration user interface 400 can include a number of user interface elements that can identify user preferences. The user interface elements can enable defining diagnosis rules 161 for a root cause analysis and launching a root cause analysis.

The root cause configuration user interface 400 can include a target issue user interface element 403. The target issue user interface element 403 can include a selector that can identify a user selection from a predetermined set of target issues 156 and target issue types. A specific target issue 156 can refer to a particular detected device event corresponding to a detected anomaly in an operating system, application, firmware, or other operation of a client device 106. A target issue "type" can refer to a nonspecific instance of types of target issues 156 such as operating system crashes, application hangs, and so on. The target issue user interface element 403 can provide a dropdown list or other element that indicates recently-detected specific target issues 156, as well as target issue types that are nonspecific to any machine detected anomaly.

The root cause configuration user interface 400 can include a time window user interface element 406. The time window for a root cause analysis can be user configured based on manipulation of the time window user interface element 406. For specific detected target issues 156 the time window user interface element 406 can be prepopulated to specify a time window corresponding to, starting at, centered at, encompassing, or otherwise relative to a detected device event.

The root cause configuration user interface 400 can include a lift value user interface element 409. A threshold minimum lift value for a root cause analysis can be user configured based on manipulation of the lift value user interface element 409. The lift value can be entered, selected from a predetermined list of options, or adjusted by manipulation of a slider or other type of user interface element. The list of options can correspond to arbitrary or friendly names, icons, or indicators; length-specifying, time-specifying, or size-specifying terms; a slider, segment selector, or other types of user interface elements.

The root cause configuration user interface 400 can include a support value user interface element 412. A threshold minimum support value for a root cause analysis can be user configured based on manipulation of the support value user interface element 412. The support value can be entered, selected from a predetermined list of options, or adjusted by manipulation of a slider or other type of user interface element. The list of options can correspond to arbitrary or friendly names, icons, or indicators; length-specifying, time-specifying, or size-specifying terms; a slider, segment selector, or other types of user interface elements.

The root cause configuration user interface 400 can include an advanced criteria user interface element 415. The advanced criteria user interface element 415 can be selected to show and hide a context feature user interface element 418 that includes a number of selectable context features 157 for the root cause analysis.

The root cause configuration user interface 400 can include a context feature user interface element 418. A user can customize the context features 157 for the root cause analysis by manipulation of the context feature user interface element 418. The context feature user interface element 418 can include a box selection interface as shown, a dropdown list, a drag and drop list, or other interface types. In some examples, a default set of context features 157 can be preselected or preconfigured corresponding to a general default set or a target issue type specific set.

The root cause configuration user interface 400 can include an estimated runtime indicator 421. The estimated runtime indicator 421 can be automatically updated in response to user manipulation of the various diagnosis rules 161 specified using the various user interface elements discussed. For example, increasing a lift value or support threshold value can decrease the estimated runtime, while decreasing a lift value or support threshold value can increase the estimated runtime. Selection of additional context features 157 can increase the estimated runtime, while deselection or removal of context features 157 can decrease the estimated runtime. As discussed earlier, increasing a sample size can increase the estimated runtime, while decreasing the sample size can decrease the estimated runtime.

The root cause configuration user interface 400 can include a run analysis user interface element 424. The run analysis user interface element 424 can transmit a root cause analysis request or otherwise launch a root cause analysis. This can include transmitting one or more requests to invoke APIs or otherwise configure the analysis configuration and other diagnosis rules 161 specified and launch the root cause analysis.

Figure 5:
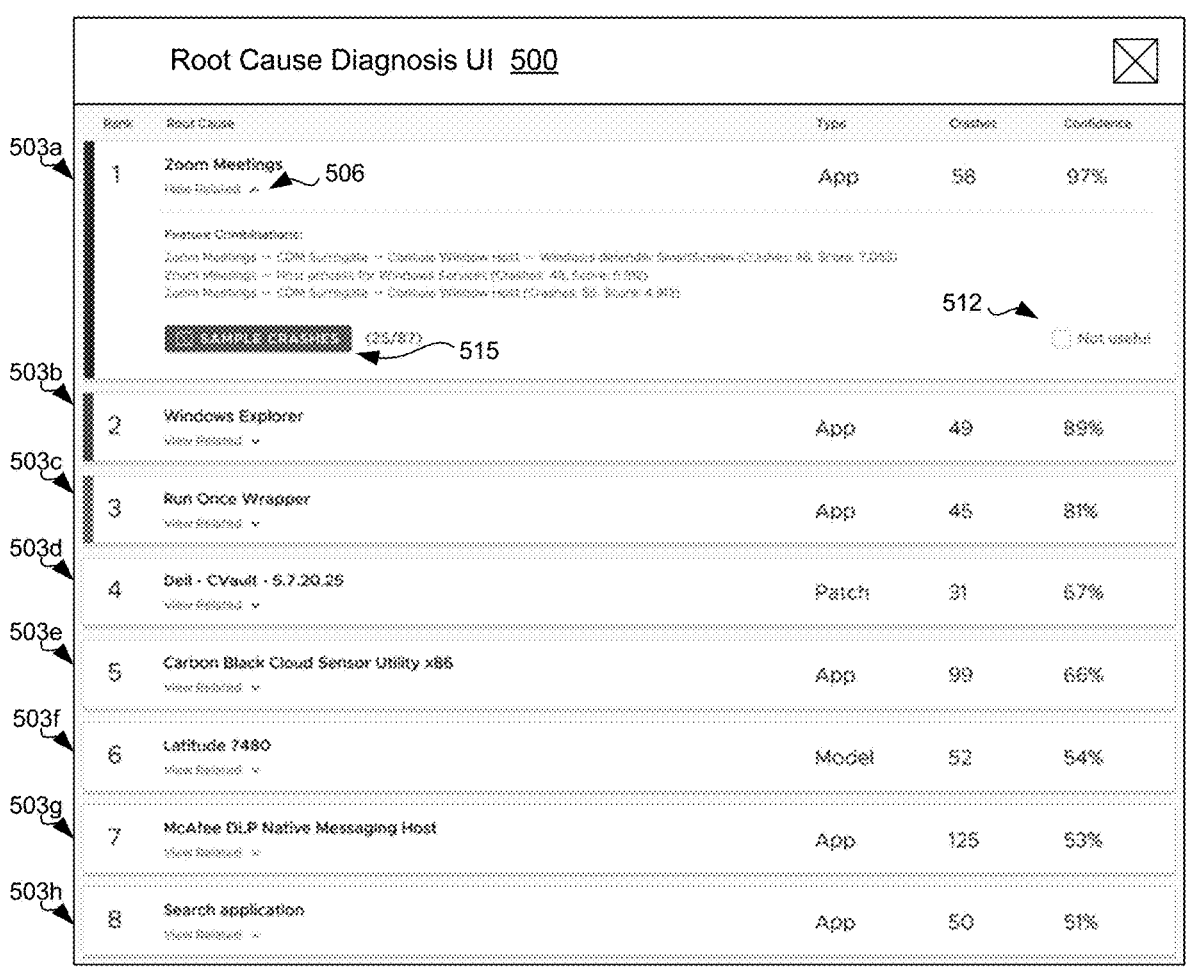
FIG. 5 illustrates another example user interface to provide troubleshooting services for enterprise information technology problems, according to various examples described herein.

FIG. 5 shows an example root cause diagnosis user interface 500. The root cause diagnosis user interface 500 can be provided as part of a management console of the management service 120, the analytics platform 104, the root cause analysis service 105, or a network service 107. The root cause diagnosis user interface 500 can include a number of user interface elements that can identify user manipulations. The user interface elements can enable a user to efficiently view the set of root cause candidate patterns of context features 157 that define root cause diagnoses 159 for a target issue 156 of a root cause analysis. The user interface elements can be generated according to the diagnosis rules 161.

The root cause diagnosis user interface 500 can include a ranked list of diagnosis pattern user interface elements 503a-503h (collectively the diagnosis pattern user interface elements 503). Each of the diagnosis pattern user interface elements 503 can correspond to an individual pattern of context features 157 or a grouping of patterns of context features 157 identified by the root cause analysis service 105. The list can be ranked according to overall confidence scores for individual patterns or groupings of patterns.

Each of the diagnosis pattern user interface elements 503 can initially be shown to include a title element that provides a title that describes a candidate root cause, a type of the candidate root cause, a numerical indicator of a number of associated crashes (or another target issue 156) that is observed for the candidate root cause, an overall confidence score for the candidate root cause, and a user interface element or subcomponent 506. The user interface element 506 can be selected to show and hide the specific context features 157 involved in each individual pattern of the grouping of patterns, as well as additional options. In various examples, any of the components of the diagnosis pattern user interface elements 503 can be provided initially, rather than after selection of the subcomponent 506.

In instances where a particular one of the diagnosis pattern user interface elements 503 corresponds to a grouping of patterns of context features 157, the user interface can show each individual pattern in the grouping in association with an individual confidence score and number of associated crashes or another target issue 156. This enables a user to quickly assess which variants within a grouping are most likely to correspond to an actual root cause. The overall confidence score can be calculated by combining all of the individual scores. In some examples, the individual and overall confidence scores can be lift values. Alternatively, a lift value can be converted into a percentage, another numerical value, a letter grade, or another type of score.

Each of the diagnosis pattern user interface elements 503 can also include a candidate pattern rejection element or subcomponent 512. User manipulation of the pattern rejection element 512 can cause this grouping to be removed, minimized, moved downward, or otherwise deprioritized and deemphasized in the root cause diagnosis user interface 500. User manipulation of the pattern rejection element 512 can also provide user input as a feedback mechanism that is used in training the machine learning models of the root cause analysis service 105 to identify weights for context features 157. Additionally or alternatively, the diagnosis pattern user interface elements 503 can include a candidate pattern confirmation element that can be user manipulated to confirm that the associated grouping of patterns is the root cause of the target issue 156. The candidate pattern confirmation element can also provide user input as a feedback mechanism that is used in training the machine learning models of the root cause analysis service 105 to identify weights for context features 157.

Each of the diagnosis pattern user interface elements 503 can also include a drill down user interface element 515. The drill down user interface element 515 can be selected to update the user interface to include additional device data 147 such as log information for a client device 106 that experienced the target issue 156. In some examples, this additional device data 147 can include or be limited to the device data 147 that was used to perform the root cause analysis. However, the additional device data 147 can also include all device data 147 that is available in the data lake 209, including device data 147 omitted from the root cause analysis. The root cause diagnosis user interface 500 permits detailed analysis without opening other applications, logging into other interfaces, and navigation to other tools. This increases efficiency of using a device that views the root cause diagnosis user interface 500 relative to existing technologies.

At least a subset of the diagnosis pattern user interface elements 503 can also include a color coded indicator such as a flag, an icon, a fill color, a hatching, a shade of a color, or another visual emphasis. In some examples darker colors, shades, and hatching can be associated with higher overall confidence, while lighter colors, shades and hatching can be associated with lower overall confidence. In other examples, a number of stars, a length of a bar, or another visual emphasis element can be associated with the overall confidence, according to the diagnosis rules 161.

The flowchart(s) and sequence diagram(s) show examples of the functions and operation of the components described herein. The components described herein can be embodied in hardware, software, or a combination of hardware and software. If embodied in software, each element can represent a module or group of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or several interconnected circuits that implement the specified logical function(s).

The management computing environment 103 can include at least one processing circuit. Such a processing circuit can include, for example, one or more processors and one or more storage or memory devices that are coupled to a local interface. The local interface can include, for example, a data bus with an accompanying address/control bus or any other suitable bus structure. Similarly, the client devices 106 can each include at least one processing circuit. Such a processing circuit can include, for example, one or more processors and one or more storage or memory devices that are coupled to a local interface.

The storage or memory devices can store data or components that are executable by the processors of the processing circuit. For example, the management service 120 and/or other components can be stored in one or more storage devices and be executable by one or more processors in the networked environment 100. Similarly, the agents, services, applications and/or other components described herein can be stored in one or more storage devices and be executable by one or more processors in the client device 106.

The management service 120 and/or other components described herein can be embodied in the form of hardware, software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the management service 120 and/or other components can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A method, comprising:

receiving, by a root cause analysis service from an analytics platform, timestamped device data corresponding to a plurality of client devices monitored by the analytics platform, the timestamped device data comprising a plurality of device context features of the client devices;

receiving, by the root cause analysis service, a plurality of parameters for a root cause analysis entered via a management console of the analytics platform, wherein the plurality of parameters include a subset of the plurality of device context features to consider in the root cause analysis and a minimum lift threshold value to be used in the root cause analysis;

identifying, by the root cause analysis service, a target issue affecting at least a subset of the client devices;

performing, by the root cause analysis service, the root cause analysis according to the plurality of parameters to generate a plurality of root cause candidate patterns, a respective root cause candidate pattern comprising at least a subset of the device context features, wherein performing the root cause analysis by the root cause analysis service comprises creating a target set of samples and a normal set of samples from the timestamped device data, computing a lift value for each of the plurality of root cause candidate patterns based on support of the root cause candidate pattern in the target set and support of the root cause candidate pattern in the normal set, and filtering the plurality of root cause candidate patterns based on comparing the computed lift value of a respective root cause candidate pattern to the minimum lift threshold value specified via the management console of the analytics platform to produce a subset of the plurality of root cause candidate patterns; and providing, by at least one of the root cause analysis service and the analytics platform, access to the subset of the plurality of root cause candidate patterns through an application programming interface (API) that is invoked by one or more network services, client devices or management services to cause at least one of the root cause analysis service and the analytics platform to transmit the subset of the plurality of root cause candidate patterns over a network connection, wherein the management console of the analytics platform generates an estimated runtime indicator for the root cause analysis, wherein modifying the minimum lift threshold value causes an update to the estimated runtime indicator by recomputing an estimated runtime of the root cause analysis based on the modified minimum lift threshold value.

2. The method according to claim 1, wherein the device context features correspond to at least one of hardware datapoints and software datapoints for the client devices.

3. The method according to claim 1, wherein the target issue comprises a problem or anomaly corresponding to the device context features comprising at least one of: device crashes, device boot time, device shut down time, application hangs corresponding to temporary non-responsiveness, application crashes, increase/decrease of application usage, failed logins, failed application launch, and application launch time.

4. The method according to claim 1, wherein the target issue is user-defined through a user interface element generated by the management console of the analytics platform.

5. The method according to claim 1, wherein the target issue is programmatically identified based at least in part on an anomaly in the timestamped device data.

6. The method according to claim 1, further comprising: providing the subset of the plurality of root cause candidate patterns via the management console of the analytics platform.

7. A non-transitory computer-readable medium embodying instructions executable by at least one computing device, the instructions, when executed, causing the at least one computing device to at least:

receive, by a root cause analysis service from an analytics platform, timestamped device data corresponding to a plurality of client devices monitored by the analytics platform, the timestamped device data comprising a plurality of device context features of the client devices;

receive, by the root cause analysis service, a plurality of parameters for a root cause analysis entered via a management console of the analytics platform, wherein the plurality of parameters include a subset of the plurality of device context features to consider in the root cause analysis and a minimum lift threshold value to be used in the root cause analysis;

identify, by the root cause analysis service, a target issue affecting at least a subset of the client devices;

perform, by the root cause analysis service, the root cause analysis according to the plurality of parameters to generate a plurality of root cause candidate patterns, a respective root cause candidate pattern comprising at least a subset of the device context features, wherein performing the root cause analysis by the root cause analysis service comprises creating a target set of samples and a normal set of samples from the timestamped device data, computing a lift value for each of the plurality of root cause candidate patterns based on support of the root cause candidate pattern in the target set and support of the root cause candidate pattern in the normal set, and filtering the plurality of root cause candidate patterns based on comparing the computed lift value of a respective root cause candidate pattern to the minimum lift threshold value specified via the management console of the analytics platform to produce a subset of the plurality of root cause candidate patterns; and provide, by at least one of the root cause analysis service and the analytics platform, access to the subset of the plurality of root cause candidate patterns through an application programming interface (API) that is invoked by one or more network services, client devices or management services to cause at least one of the root cause analysis service and the analytics platform to transmit the subset of the plurality of root cause candidate patterns over a network connection, wherein the management console of the analytics platform generates an estimated runtime indicator for the root cause analysis, wherein modifying the minimum lift threshold value causes an update to the estimated runtime indicator by recomputing an estimated runtime of the root cause analysis based on the modified minimum lift threshold value.

8. The non-transitory computer-readable medium according to claim 7, wherein the device context features correspond to at least one of hardware datapoints and software datapoints for the client devices.

9. The non-transitory computer-readable medium according to claim 7, wherein the target issue comprises a problem or anomaly corresponding to the device context features comprising at least one of: device crashes, device boot time, device shut down time, application hangs corresponding to temporary non-responsiveness, application crashes, increase/decrease of application usage, failed logins, failed application launch, and application launch time.

10. The non-transitory computer-readable medium according to claim 7, wherein the target issue is user-defined through a user interface element generated by the management console of the analytics platform.

11. The non-transitory computer-readable medium according to claim 7, wherein the target issue is programmatically identified based at least in part on an anomaly in the timestamped device data.

12. The non-transitory computer-readable medium according to claim 7, further comprising instructions that, when executed, cause the at least one computing device to at least: provide the subset of the plurality of root cause candidate patterns via the management console of the analytics platform.

13. A system, comprising:

at least one computing device; and instructions accessible by the at least one computing device, wherein the instructions, when executed, cause the at least one computing device to at least:

receive, by a root cause analysis service from an analytics platform, timestamped device data corresponding to a plurality of client devices monitored by the analytics platform, the timestamped device data comprising a plurality of device context features of the client devices;

receive, by the root cause analysis service, a plurality of parameters for a root cause analysis entered via a management console of the analytics platform, wherein the plurality of parameters include a subset of the plurality of device context features to consider in the root cause analysis and a minimum lift threshold value to be used in the root cause analysis;

identify, by the root cause analysis service, a target issue affecting at least a subset of the client devices;

perform, by the root cause analysis service, the root cause analysis according to the plurality of parameters to generate a plurality of root cause candidate patterns, a respective root cause candidate pattern comprising at least a subset of the device context features, wherein performing the root cause analysis by the root cause analysis service comprises creating a target set of samples and a normal set of samples from the timestamped device data, computing a lift value for each of the plurality of root cause candidate patterns based on support of the root cause candidate pattern in the target set and support of the root cause candidate pattern in the normal set, and filtering the plurality of root cause candidate patterns based on comparing the computed lift value of a respective root cause candidate pattern to the minimum lift threshold value specified via the management console of the analytics platform to produce a subset of the plurality of root cause candidate patterns; and provide, by at least one of the root cause analysis service and the analytics platform, access to the subset of the plurality of root cause candidate patterns through an application programming interface (API) that is invoked by one or more network services, client devices or management services to cause at least one of the root cause analysis service and the analytics platform to transmit the subset of the plurality of root cause candidate patterns over a network connection, wherein the management console of the analytics platform generates an estimated runtime indicator for the root cause analysis, wherein modifying the minimum lift threshold value causes an update to the estimated runtime indicator by recomputing an estimated runtime of the root cause analysis based on the modified minimum lift threshold value.

14. The system of claim 13, wherein the device context features correspond to at least one of hardware datapoints and software datapoints for the client devices.

15. The system of claim 13, wherein the target issue comprises a problem or anomaly corresponding to the device context features comprising at least one of: device crashes, device boot time, device shut down time, application hangs corresponding to temporary non-responsiveness, application crashes, increase/decrease of application usage, failed logins, failed application launch, and application launch time.

16. The system of claim 13, wherein the target issue is user-defined through a user interface element generated by the management console of the analytics platform.

17. The system of claim 13, wherein the target issue is programmatically identified based at least in part on an anomaly in the timestamped device data.

18. The system of claim 13, further comprising instructions which, when executed, cause the at least one computing device to at least: provide the subset of the plurality of root cause candidate patterns via the management console of the analytics platform.

\* \* \* \* \*